United States Patent

Brookes

[11] Patent Number: 4,832,286
[45] Date of Patent: May 23, 1989

[54] DOOR ARRANGEMENTS FOR AIRCRAFT

[75] Inventor: William Brookes, Woodford, United Kingdom

[73] Assignee: British Aerospace Public Limited Company, Woodford, England

[21] Appl. No.: 114,990

[22] Filed: Oct. 30, 1987

[30] Foreign Application Priority Data

Oct. 31, 1986 [GB] United Kingdom ................ 8626125
Nov. 12, 1986 [GB] United Kingdom ................ 8627089

[51] Int. Cl.$^4$ .............................................. B64C 1/22
[52] U.S. Cl. ................................ 244/118.3; 244/129.5
[58] Field of Search ............... 244/129.5, 129.4, 118.1, 244/118.2, 137.1, 118.3; 160/130, 185, 183, 218; 49/254, 37, 40, 79; 14/71.1, 71.5, 72.5

[56] References Cited

U.S. PATENT DOCUMENTS

| | | |
|---|---|---|
| 3,128,068 | 4/1969 | Pauli ................................ 244/129.5 |
| 3,424,411 | 1/1969 | Blunschi, Sr. ..................... 244/118.1 |
| 3,718,171 | 2/1973 | Godwin ............................ 244/129.5 |
| 3,730,456 | 5/1973 | Morgan ............................ 244/129.5 |
| 4,097,009 | 6/1978 | Barnes ............................. 244/129.5 |
| 4,140,291 | 2/1979 | Evans .............................. 244/129.5 |
| 4,167,258 | 9/1979 | Robertson ........................ 244/129.5 |

FOREIGN PATENT DOCUMENTS 1182963 12/1964 Fed. Rep. of Germany.

Primary Examiner—Galen L. Barefoot
Attorney, Agent, or Firm—Cushman, Darby & Cushman

[57] ABSTRACT

A rear loading door arrangement for aircraft having an access opening for the ground loading or air-borne delivery of freight and other items and which, when not in use, is closed off by a multi-panelled door assembly. This door assembly comprises a series of hingeably interconnected panels adaptable such that when closed they conform to and define the aircraft rear fuselage profile but when opened they are drawn from the access opening and stowed in a folded configuration to give uninterrupted access for movement of the loads into or out of the aircraft.

5 Claims, 6 Drawing Sheets

DOOR ARRANGEMENTS FOR AIRCRAFT

This invention relates to door arrangements for aircraft. More particularly it is concerned with an improved rear loading door arrangement, typically for use in transport aircraft.

Rear loading door arrangements are well known in connection with the in-flight delivery of payloads and these door arrangements may be determined by a given payload envelope which they must accommodate; that is they must be capable of giving adequate clearance to enable the payload to pass into and out of the aircraft. The rear fuselage shape may be determined by these loading requirements and since the doors will conform to the fuselage shape, in the case of outwardly opening doors their use in the airborne payload delivery mode will necessitate the doors protruding into the airstream which is aerodynamically undesirable. This may be overcome by the use of an inwardly opening door but the intrusion on the contained volume of the fuselage will again determine the rear fuselage shape if the required payload envelope and the locus of travel into or out of the aircraft is to be accommodated. It is the object of the present invention to provide an improved rear loading door arrangement.

According to the present invention there is provided a door arrangement for aircraft including an access opening in the fuselage of said aircraft and a multiple panel door assembly associated with said access opening, said door assembly being adaptably configured such that in its closed position it generally conforms to the aircraft fuselage profile to close off said access opening and in its open position it adopts a folded configuration, characterised in that said door assembly comprises a series of adjacent door panel portions each hingeably located to its adjacent panel or panels such that, in combination, the panels effectively form a single door panel assembly, said assembly located at or about its longitudinal boundaries to fuselage structure adjacent said access opening, the arrangement including actuating means for drawing said door assembly from said access opening and stowing in said folded open configuration.

Certain preferred embodiments of the invention will now be described, by way of example only, and with reference to the accompanying drawings in which.

Figure 5A:
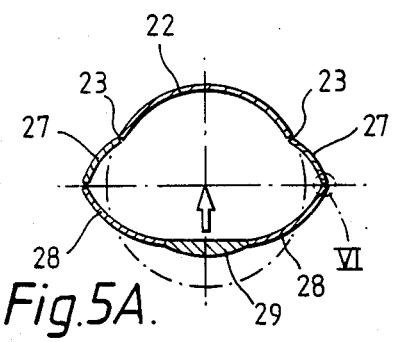
Figure 5B:
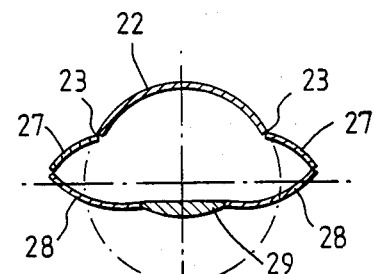
Figure 5C:
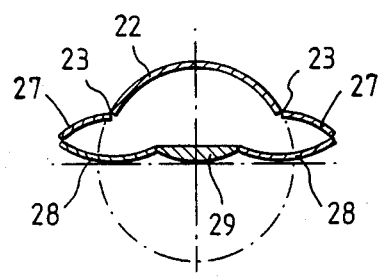

FIGS. 5A–5C inclusive illustrate, diagrammatically, three stages in the door opening sequence in accordance with the present invention.

Figure 6:
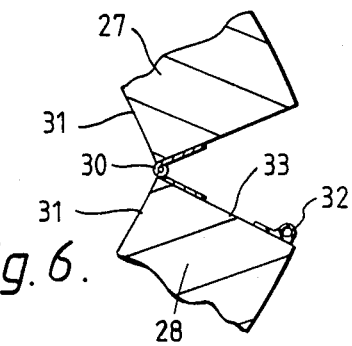

FIG. 6 illustrates a typical hinged interconnection between adjacent door panel portions, indicated as Detail VI in FIG. 5A.

Figure 7A:
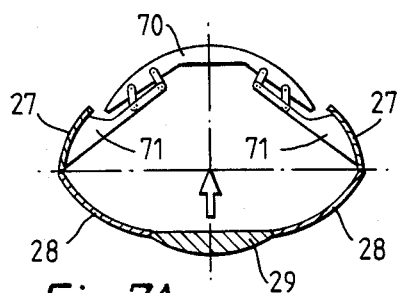
Figure 7B:
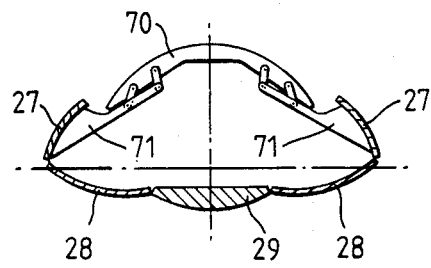
Figure 7C:
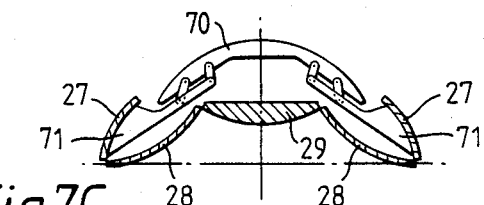

FIGS. 7A–7C inclusive illustrates diagrammatically three stages in the door opening sequence of an alternative embodiment in accordance with the present invention.

Figure 8:
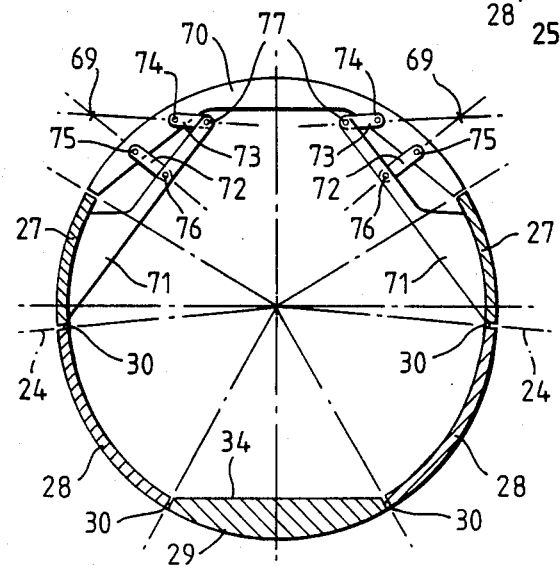

FIG. 8 is a diagrammatic vertical cross-section through the fuselage illustrating an alternative embodiment of a door arrangement in accordance with the invention.

Figure 9:
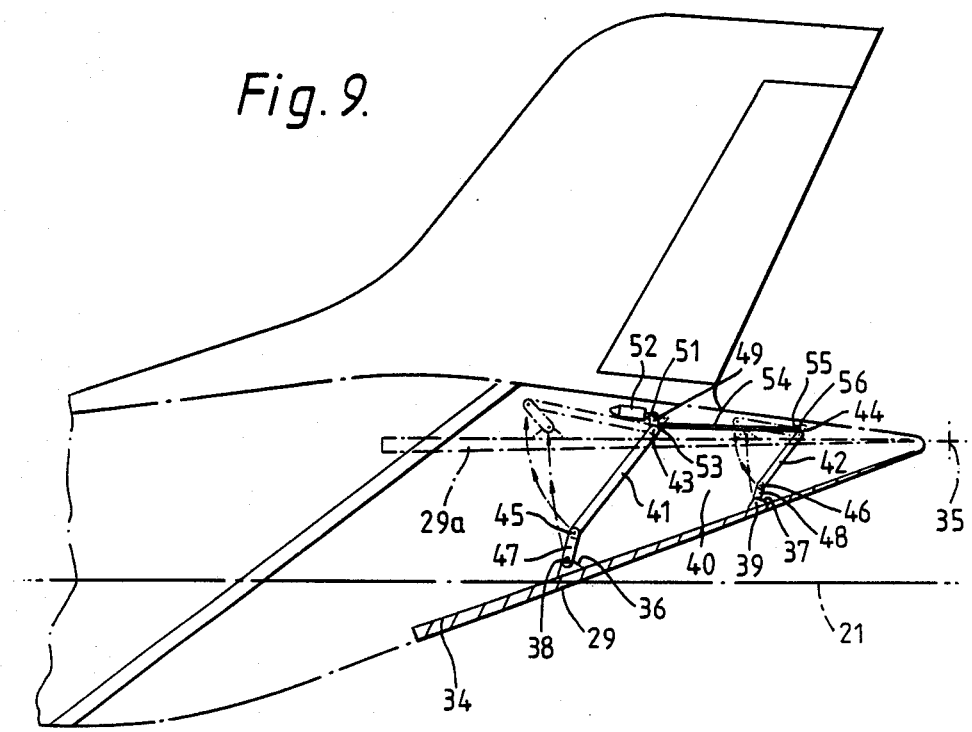
Figure 10:
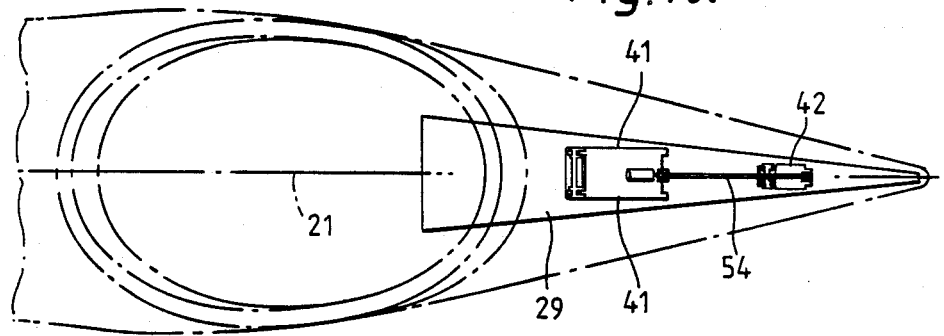

FIGS. 9 and 10 illustrate one embodiment of door actuating mechanism.

Figure 11:
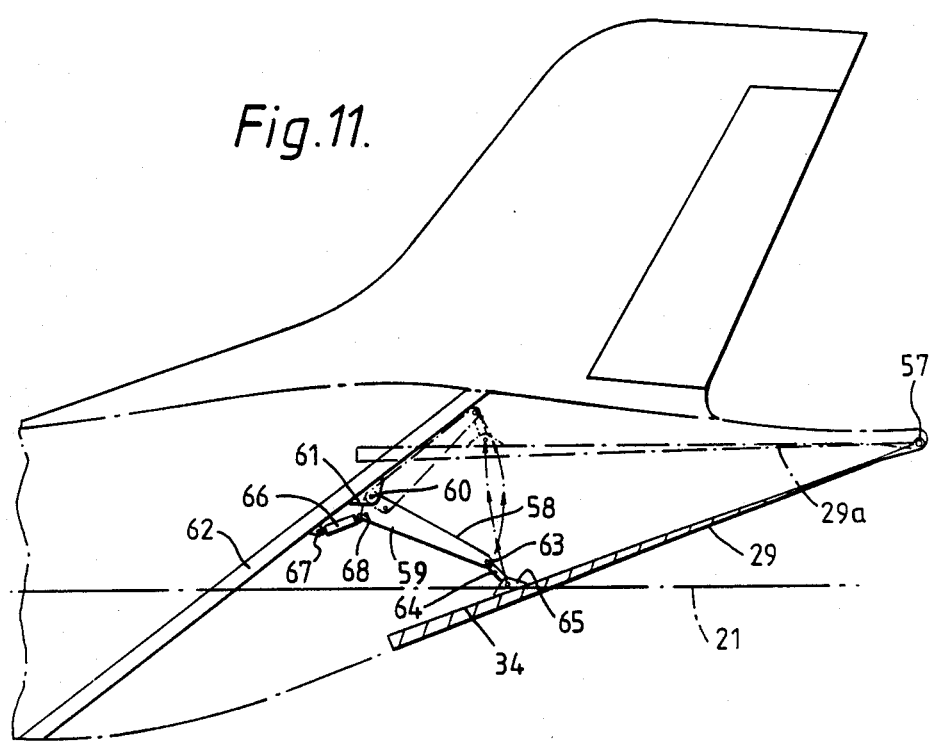
Figure 12:
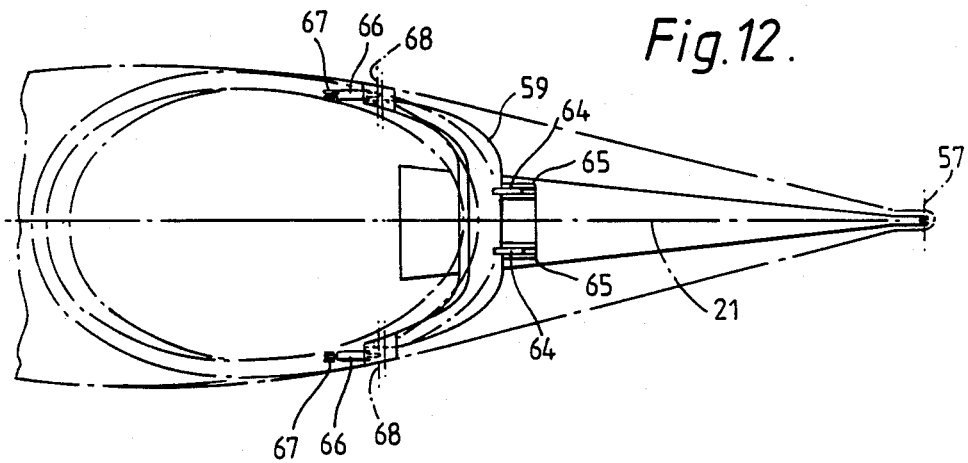

FIGS. 11 and 12 illustrate an alternative embodiment of door actuating mechanism.

Figure 1:
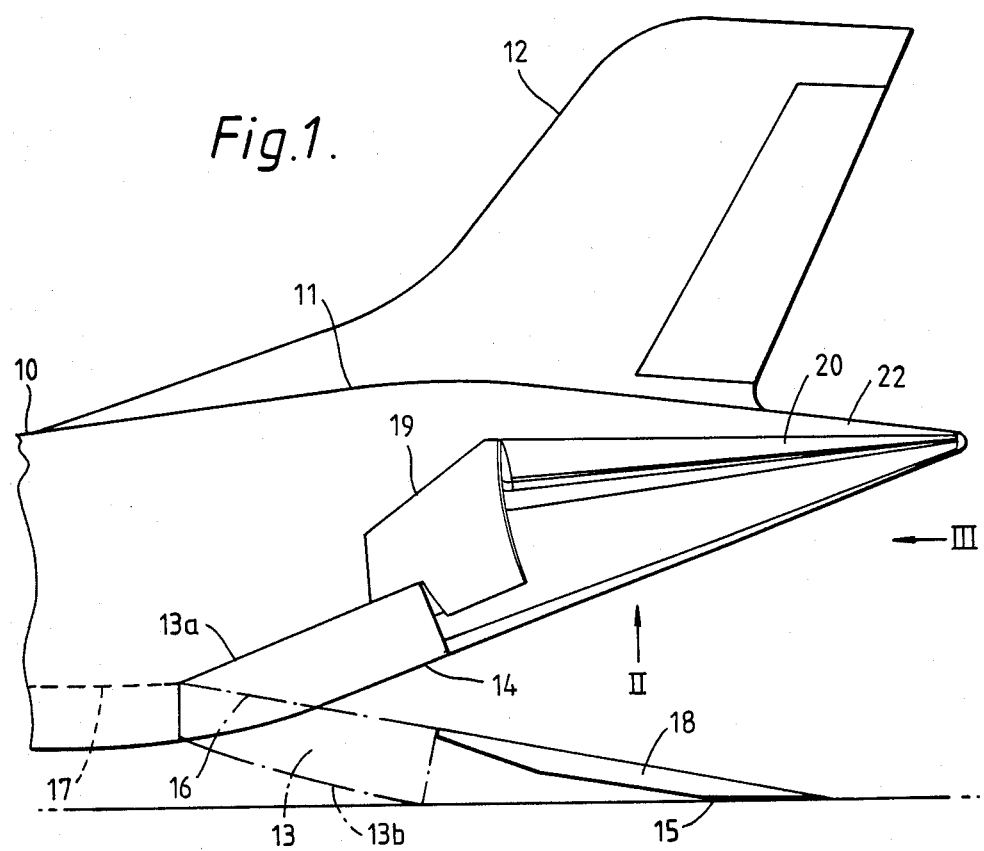
FIG. 1 illustrates a side elevation on a rearward portion of a transport aircraft configured for the freight carrying role.
Figure 2:
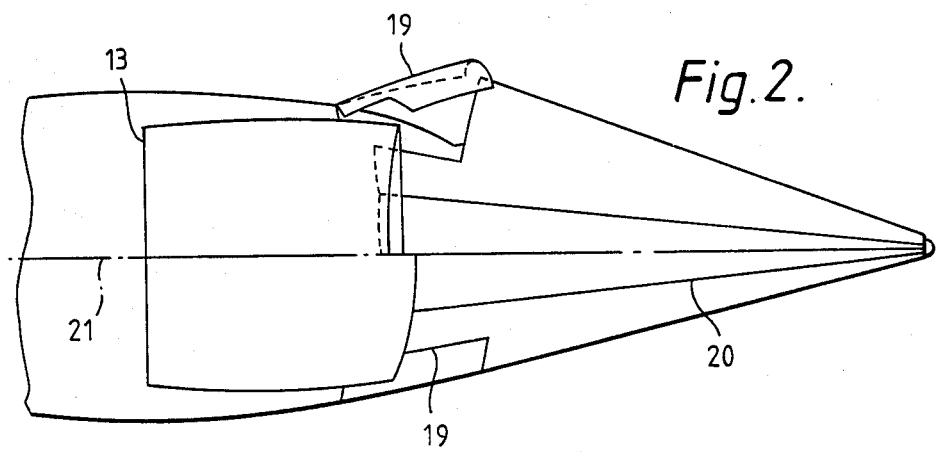
FIG. 2 illustrates an inverted plan on the rearward portion of the same transport aircraft viewed in direction of Arrow II in FIG. 1.
Figure 3:
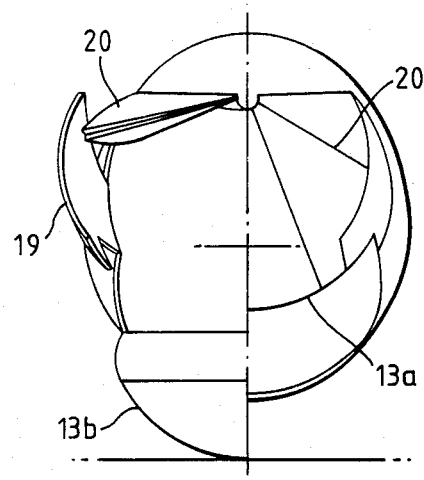
FIG. 3 is an end view on the same rearward portion viewed in direction of Arrow III in FIG. 1.

Referring to the drawings, FIG. 1 and FIG. 2 illustrate a rearward portion of a transport aircraft 10 comprising a rear fuselage portion 11 and a tail fin 12. The rear fuselage portion 11, sharply tapering in a rearwards direction includes a retractable loading ramp 13, air brakes 19 and a rear-loading door arrangement 20, the subject of the present invention. The loading ramp 13 is shown in retracted position 13a where it conforms to the fuselage profile 14 and a deployed position 13b. It is pivotally located to the fuselage structure by means not shown but arranged such that the inner ramp surface 16 substantially intersects the aircraft floor 17 to enable transfer of freight and other loads into and out of the aircraft. In the ground loading mode, as illustrated, a supplementary ramp 18 extends between the deployed ramp door 13b and the ground 15. FIG. 2 is composite illustration, showing at the upper half (as illustrated) relative to the aircraft longitudinal centre line 21, the ramp door 13, air brake 19 and rear-loading door 20 in open position and the lower half the same components in closed configuration. The ramp 13 is a single component symmetrically disposed about the aircraft longitudinal centre line 21.

The rear loading door arrangement 20 will now be described in detail. Although associated with a fuselage of circular cross-sectional form in the present embodiment it is equally applicable to non-circular arrangements.

Figure 4:
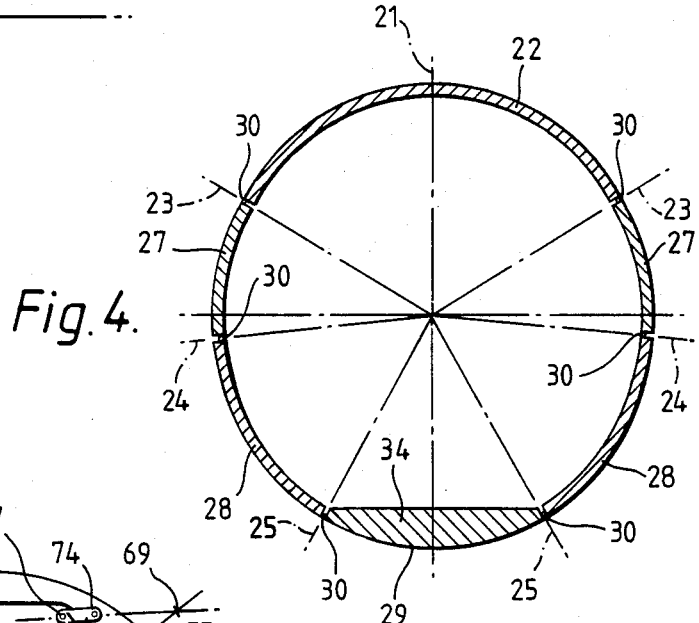
FIG. 4 is a diagrammatic vertical cross-section through the fuselage illustrating one embodiment of a door arrangement in accordance with the invention.

Referring to FIGS. 4 to 6 inclusive, the arrangement comprises a series of five interconnected door panel portions hingedly depending from the rear fuselage fixed structure 22 and configured such that when closed, in combination they conform to the aerodynamic profile of the rear fuselage. The longitudinal boundary of each door panel portion is determined by the radial disposition of longitudinal hinge axes as illustrated in FIG. 4 and which are symmetrically disposed to port and starboard sides of the aircraft, namely, upper hinge axes 23, which additionally determines the lower boundary of the fuselage fixed structure 22, intermediate hinge axes 24 and lower hinge axes 25. The upper and intermediate hinge axes 23 and 24 respectively determine the upper door panel 27, the intermediate and lower hinge axes 24 and 25 respectively determine the intermediate door panel 28 whilst the single lower door panel 29, symmetrically disposed about the aircraft longitudinal centre line 21 lies intermediate the lower hinge axes 25. As illustrated in FIG. 6 each panel is interconnected to its adjacent panel by hinge 30. In FIG. 6 the hinge is shown located adjacent the inner surface 31 of the door panels 27 and 28 with a longitudinal flexible seal 32 located to the end face 33 of door panel 28 close to the door outer surface. This is by way of example only; a similar arrangement is applicable at the interconnections between door panels 28 and 29 and between door panel 27 and the fixed structure 22. However, in those locations the longitudinal hinges lie adjacent the outer surfaces and the flexible seals 32 adjacent the inner surfaces to accommodate the door folding geometry. Although in the arrangement of FIG. 6 a simple piano type hinge is depicted, this is by way of example only and various alternative arrangements can be adopted dependent on specific operational and structural requirements.

The lower panel portion 29 includes a horizontal inner face 34 providing a mounting face for the door actuating mechanism not illustrated in this diagrammatic section but described hereafter with references to FIGS. 9–12 inclusive.

FIGS. 9 and 10 describe one embodiment of door actuating mechanism and for reasons of clarity the outline of the aircraft is shown in chain dot. In this arrangement the lower door panel 29 is shown in full line in the door closed position and in chain dot line 29a in the open position and the actuating mechanism is configured to give an effective pivotal rotation of the door about a theoretical transverse door hinge axis 35. The remaining interconnected door panel are omitted for reasons of clarity. Transversely spaced apart attachment brackets 36 and 37 provide pivotal attachments 38 and 39 respectively to the door actuating assembly 40. This assembly comprises a forward diagonally disposed lever beam 41 and a rearward diagonally disposed lever beam 42 respectively including upper pivotal attachments 43 and 44 respectively to the fixed fuselage structure 22 and lower pivotal attachments 45 and 46 to links 47 and 48 providing interconnection between the lever beams 41 and 42 and the door panel 29. The lever beam 41 further includes a bell crank portion 49 incorporating a pivotal attachment 51 to an hydraulic jack 52 pivotally attached to the fixed fuselage structure 22 and a pivotal attachment 53 to a push rod 54 pivotally attached at its rearward extremity 55 to a bell crank portion 56 extending upwardly from lever beam 42. As indicated, operation of the hydraulic jack 52 effects rotation of the door panel 29 from its closed position to the stowed position 29a.

FIGS. 11 and 12 illustrate one further embodiment of actuating mechanism in which the lower panel portion is pivotally located to the fixed fuselage structure 22 at its rearward extremity about a transverse hinge axis 57 and, as in the previously described embodiment is movable from its closed position to its deployed position 29a as indicated in chain-dot-line. The mechanism 58 for effecting such actuation comprises a yoke member 59 including upper pivotal attachments 60 to hinge brackets 61 mounted upon the rearward face of a diagonally disposed structural member 62 and lower pivotal attachments 63 to a pair of links 64 providing interconnection to attachments brackets 65 mounted upon the door inner surface 34. Twin hydraulaic jacks 66 are pivotally located at 67 to the structural member 62 and have a pivotal attachment 68. Actuation of the hydraulic jacks 67 causes angular displacement of the yoke 59 to effect door opening. The yoke is configured so that when the door is open it will in no way obstruct the transfer of loads into and out of the aircraft and additionally it will straddle the door assembly when in its fully stowed position.

The door opening sequence is diagrammatically illustrated in FIGS. 5A–5C inclusive. As the lower door panel 29 moves vertically upwards under the control of the actuating mechanism a 'clamshell effect' closure of the associated door panel 27 and 28 is automatically induced, with differential hinging movement between the adjacent panels and the whole hinging about the fixed fuselage structure 22 into a compact stowed configuration. In this arrangement the upper door panel 27 is hingeably located to the fixed structure 22 and moves about the longitudinal hinge axis 23.

An alternative embodiment will now be described with reference to FIGS. 7A–7C inclusive and FIG. 8 which provides variation in the closure geometry and improved headroom. Where relevant similar reference numbers are used for components comparable with the previous embodiment. The section of FIG. 8 represents a typical door hinge station and there will be at least two such stations along the length of the loading door.

Referring to FIG. 8, the rear loading door arrangement comprises a series of five interconnected door panel portions, upper and intermediate door panels 27 and 28 (port and starboard) and a single lower door panel 29. As in the previous embodiment the longitudinal boundaries of each panel is determined by radial disposition of longitudinal hinge axes. In this embodiment, however, the upper longitudinal boundary of the upper door panel 27 does not constitute a hinge axis. Hinging and sealing of the interconnected door panel portions is as previously discussed with reference to FIG. 6. The upper door panels 27 each include cranked cantilever beams 71 extending upwardly and inwardly to support a 4-bar linkage geometric arrangement. The upper region of the beams 71 includes a pivotal attachment 76 to a lower link 72 and a pivotal attachment 77 to an upper link 73 these links respectively including outer pivotal attachments 75 and 74 to the fixed fuselage structural member 70. The links are convergently arranged such that the theoretical intersection of the longitudinal centre lines passing through the respective pivot centre lines constitutes an instantaneous virtual hinge point 69 external to the fuselage profile. By this arrangement, the door is positively supported in its closed position but when opened to its stowed configuration, as illustrated, in sequence, in FIGS. 7A–7C inclusive, this 4-bar linkage geometric arrangement provides certain beneficial advantages:

(a) The geometry in the doors-open position is more efficient in that a given aerodynamic or inertia load induces less internal load in the doors because the instantaneous virtual hinge point for the top doors is further outboard than for conventional edge hinging arrangements. Thus rigidity is improved and the upper and intermediate doors in their open position are less sensitive to any arising lateral deflections of the lower door panel.

(b) The lack of direct interconnection between the fixed structure and the upper door and the separation afforded by the geometry permits the use of external surface longitudinal curvatures without the risk of fouls occurring during door operation. This gives considerably more freedom of choice of rear fuselage contours.

(c) The upper door boundary can be lower, ie, the fixed structure can be deeper and the upper door panel narrower.

(d) Less frontal area of door is projected into the airstream.

The unique composite construction and operating geometry of the rear loading door of the present invention offers significant aerodynamic and operational benefit particularly in the in-flight delivery mode and reduces to a significant degree the limitations associated with prior art loading door arrangements. The present door arrangement may be used in conjunction with a loading ramp or in particular rear fuselage arrangements may be utilised alone. Variations can be applied to meet specific requirements. In the embodiment described herein, for example, with reference to FIG. 1, airbrakes 19 are positioned such that they can act as doors, reducing the size needed for the rear loading doors. When the rear loading doors are opened, the air brakes are opened just sufficiently to clear the path of the payload but not such as would produce high aerodynamic drag in the in-flight mode. A further advantage of this arrangement is that whilst the rear loading doors in their open configuration lie substantially within the main envelope of the fuselage and thus well clear of the main airstream, partly deployed airbrakes shroud those parts of the assembly lying outside the main envelope from the full force of the airstream. This is illustrated in FIG. 2, the lower half of the view showing airbrake 19 and the loading doors in closed position, the upper half of the view showing the partially opened air brake shielding the deployed loading door.

Other door arrangements may be adopted without departing from the scope of the invention. For example, although not illustrated, the multiple panel assembly may retain the upper panels 27 hingeably located at or about the longitudinal boundaries of the access opening but with the lower panel 29 replaced with a pair of panels hingeably located to each other along the bottom longitudinal centre line and at their upper boundaries to the upper panels 27 or to intermediate panels 28, for example. The actuating means would, when operated, cause the assembly to fold upwards about the lower hinge centre.

I claim:

1. A door arrangement for a freight transport aircraft having an access opening in its rear fuselage whose port and starboard longitudinal boundaries are defined by a fixed rearwardly extending upper structural portion of said rear fuselage, said door arrangement comprising: a multiple panel door assembly and door actuating means, said multiple panel door assembly comprising a series of adjacent door panels each hingeably connected to its adjacent panel or panels such that in combination said panels effectively form a single door panel assembly, said multiple panel assembly being hingeably connected at or about each of its longitudinal boundaries to the respective port and starboard sides of said upper structural portion such that when closed said assembly conforms to and defines the rear fuselage shape below said upper structural portion but when drawn upwardly from said closed position by said actuating means it becomes stowed in folded configuration adjacently below said upper structural portion and over the whole range of operation there is no physical detachment between said multiple panel assembly and said upper structural portion.

2. A door arrangement according to claim 1 in which the longitudinal boundaries of said door assembly lie substantially adjacent to said port and starboard longitudinal boundaries of said access opening and the boundaries of said adjacent door panels are defined by and lie adjacent to longitudinally generated hinge axes.

3. A door arrangement according to claim 1 in which said multiple panel door assembly comprises a lower panel symmetrically located about the aircraft vertical centre line, upper panels hingeably connected at their upper longitudinal edges to the fixed upper structural portion and at least one intermediate panel hingeably interconnecting said upper and lower panels.

4. A door arrangement according to claim 3 in which said multiple panel door assembly is hingeably supported off the fixed upper structural portion by a 4-bar linkage geometric arrangement, said arrangement comprising a cantilever beam mounted upon each of said upper panels and extending upwardly and inwardly in a generally diagonal direction, said cantilever beams each including a first pivotal attachment to a first lower link and a second pivotal attachment to a second upper link, said first and second links respectively including third and fourth pivotal attachments to said fixed upper structural portion, said first and second links being convergently arranged such that the theoretical intersection of the longitudinal centre lines passing through the respective pivot centres constitutes an instantaneous virtual hinge point external to the fuselage profile.

5. A door arrangement according to claim 3 in which said lower panel is pivotally attached to said fixed upper structural portion adjacent its rearward extremity and said actuating means is connected to said lower panel and causes, when operated, angular displacement of said lower panel in an upward direction and associated folding of the interconnected upper and intermediate panels from a fully closed to a stowed position.

* * * * *